Patented Aug. 10, 1948

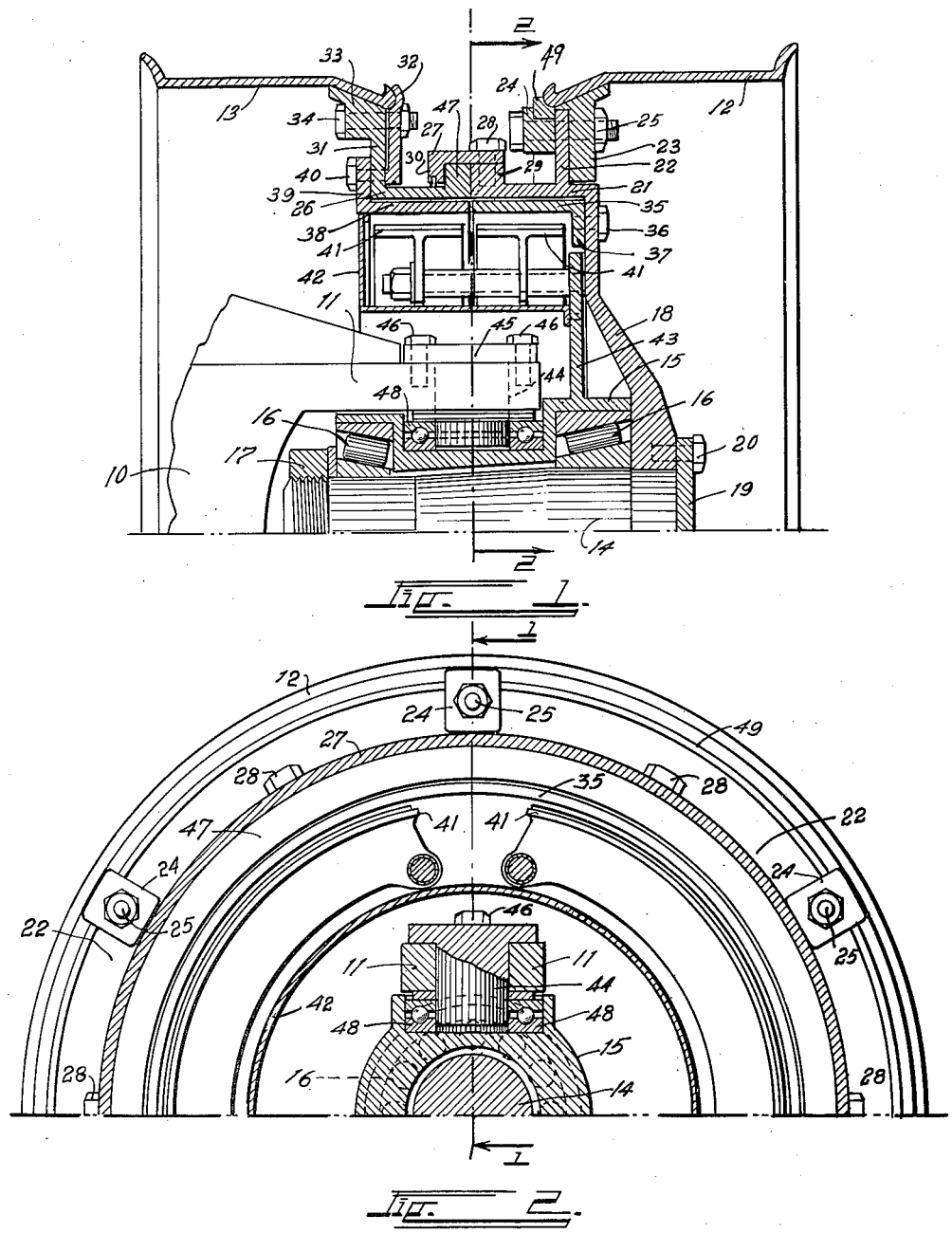

2,446,699

UNITED STATES PATENT OFFICE 2,446,699

DUAL WHEEL CONSTRUCTION

Vactor G. Garnett and Edward V. Garnett, Denver, Colo.

Application January 1, 1945, Serial No. 570,852

6 Claims. (Cl. 188—18)

This invention relates to a dual wheel construction for vehicles and has for its principal object the provision of a simple and highly efficient wheel mounting which will allow one of the dual wheels to rotate differentially of the other and which will permit both to be effectively braked.

Another object of the invention is to so construct the mounting that it can be used as a dirigible steering wheel and so that when in such use the center line of the load between the two wheels will intersect the steering pivot so that all cantilever strains and stresses are eliminated, and wherein ample space is allowed for thus mounting said pivot.

Still another object is to provide a construction in which the differential bearing allowing movement between the two wheels will not be adjacent the periphery thereof, the object being to remove it as far as possible from the heat generated by the tires and brakes, and at the same time to provide a relatively large diameter bearing surface so as to reduce wear to a minimum.

A further object of the invention is to provide a dual wheel structure of this character in which either or both of the dual wheels can be quickly and easily removed and replaced.

Other objects and advantages reside in the detailed construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a vertical section through the upper portion of the improved dual wheel and its mounting, the lower portion thereof is simply a duplication of the upper portion, except for mounting of brake shoes which is shown in Fig. 2.

Fig. 2 is a vertical section taken on the line 2—2, Fig. 1.

In the drawings the wheel has been illustrated as mounted on a front steering axle of the vehicle, it being understood that the same construction could be employed on a rear or trailing axle.

In the drawing, a portion of a typical front axle is indicated at 10 with its steering spindle yoke at 11. Typical demountable rims of any standard type are indicated by numerals as follows: outer rim 12, inner rim 13.

The outer dual wheel 18, is carried on an axle stud 14, which is rotatably mounted in a hollow bearing member 15, upon suitable anti-friction bearings 16. Bearing member 15 also serves as a steering knuckle. The axle stud 14 is held in place in its bearings by means of a retainer nut 17, which is threaded on the extremity of the stud 14. The outer extremity of the stud carries outer wheel 18, which is preferably shrunk over the stud and secured against a head flange 19, thereon by means of suitable wheel screws 20 adjacent its periphery.

The wheel 18 is inwardly flanged, as shown at 21, terminating in a ribbed portion 29 to form a cylindrical bearing by slidable contact with a similar rib 47 on inner wheel 31. A rim flange 22 extends outwardly from the portion 21. A bevelled rim clamping ring 23, is secured to the rim flange 22 to provide support for the outer rim 12. A split rim retaining ring 49 holds the rim 12 in place on the ring 23. The split ring 49 is held in place by means of hooked rim lugs 24. The entire rim assembly is clamped in place by means of suitable rim bolts 25.

A flanged portion 26 of inner wheel 31, of the same diameter as the flanged portion 21 of outer wheel 18, is maintained in alignment with the latter by means of a split bearing ring 27. The bearing ring 27 is secured by means of attachment screws 28 to the peripheral edge of rib 29, and is provided with a hooked lip 30 which engages a similar rib 47, on the flanged portion 26 of inner wheel 31, so that the two wheels are maintained in alignment with each other and are relatively rotatable with respect to each other.

The flanged portion 26 is formed with disc portion of wheel 31 which has a bevelled peripheral portion 33 for receiving the rim 13. The latter is clamped in place on the portion 33 by means of demountable rim clips 32 and wheel bolts 34.

An outer brake drum thirty-five (35) is secured in spaced relation to wheel 18 by means of drum bolts 36 which are tapped into a flange 37 formed on the brake drum 35. Brake drum 38 having a peripheral flange 39 is secured to wheel 31 by means of drum bolts 40. The space between the drums 35 and 38 and their wheel flanges 21 and 26 reduce heat transference to the bearing ribs 29 and 47 and the bearing ring portions 27 and 30.

Any standard brake shoes, such as indicated at 41, with any standard brake operating mechanism may be placed within the drums 35 and 38. The brake mechanisms are enclosed by means of a brake housing 42 which is secured to a supporting flange 43 on the hollow bearing member 15. The flange 43 also supports the standard brake mechanism for operating the shoes 41.

The member 15, which serves also as a steering knuckle, is mounted in the yoke 11 of the axle 10 upon top and bottom pivot members 44, which extend upwardly and downwardly through the jaws of the yoke member 11 and are secured therein by means of attachment flanges 45 and bolts 46. The inwardly projecting extremities of the pivot members 44 are journalled in suitable anti-friction thrust bearings 48 in the top and bottom of the bearing member 15. The member 15 will, of course, be provided with the usual steering arm (not shown) by means of which it may be rotated by the steering mechanism of the vehicle for steering purposes.

It can be readily seen that when the vehicle is turning in an arc the inner wheel rim 13 can rotate at a lower speed than the outer rim 12, the differential being taken up in friction between the split bearing ring 27 and its flange 30 and the ribs 29 and 47, so that differential movement is obtained to prevent tire wear on curves. Split bearing ring 27 and its flange 30 are formed integrally and consist of two semicircular segments.

The outer rim 12 and its tire can be easily removed by simply removing the nuts of the rim bolts 25 and the clamping ring 23. The inner rim 13 and its tire can be removed by removing the nuts of the bolts 34 and passing the rim outwardly over the rim flange 22 of the outer wheel. The brake drums 35 and 38 can be easily removed and replaced without disturbing the connection between the two wheels. The entire wheel mechanism can be easily removed by simply removing the retaining nut 17.

It is desired to call attention to the fact that the center of load through the pivot members 44 is positioned exactly between the two rims 12 and 13 so that both the gravitational load, the traction drag, and the braking resistance on the wheels is counterbalanced about the axis of the pivots 44. This avoids all cantilever stresses on the axle stud 14 and its bearings, and also balances horizontal turning moments so that the vehicle may be steered in either direction with a minimum of effort.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A dual wheel construction for vehicles comprising; an axle bearing; a first wheel journalled on said axle bearing and having an inner face and an outer face; an annular bearing extending from the inner face of said first wheel; a second wheel rotatably mounted on said annular bearing; a first brake drum on the inner face of said first wheel; a second brake drum on said second wheel adjacent to and in alignment with the first brake drum; said brake drums being positioned within the periphery of said annular bearing and on each side thereof, and braking means for said drums.

2. A dual wheel construction for vehicles comprising: an axle bearing; a first wheel journalled on said axle bearing and having an inner face and an outer face; an annular bearing extending from the inner face of said first wheel; a second wheel rotatably mounted on said annular bearing; a first brake drum on the inner face of said first wheel; a second brake drum on said second wheel, so arranged as to position said drums in alignment between said wheels, said annular bearing being of a larger diameter than said drums and lying in a plane passing between said drums.

3. A dual wheel construction for vehicles comprising: a bearing member; a first wheel axially mounted in and supported by said bearing member and having an inner side and an outer side; an annular bearing concentrically surrounding said bearing member; a second wheel positioned closely adjacent said first wheel and journalled on said annular bearing; said annular bearing being secured to the first wheel at its inner side and rotatably mounting the second wheel; a drum secured to the inner side of the first wheel; a second drum secured to the second wheel, said drums being of smaller diameter than, and being surrounded by said annular bearing; and brake means for each of said drums, so that said wheels may rotate at different speeds and so that the motion of both said wheels may be simultaneously retarded.

4. A dual wheel construction for vehicles comprising: a bearing member; a first wheel axially mounted in and supported by said bearing member and having an inner side and an outer side; an annular bearing concentrically surrounding said bearing member; a second wheel positioned closely adjacent said first wheel and journalled on said annular bearing, said annular bearing being secured to the first wheel at its inner side and rotatably mounting the second wheel in a plane between said wheels; a drum secured to the inner side of the first wheel; a second drum secured to the second wheel, said drums being of slightly smaller diameter than said annular bearing and being positioned on opposite sides of a plane passing through said annular bearing; and brake means for said drums so that said wheels may rotate at different speeds and so that the motion of both said wheels may be simultaneously retarded.

5. A dual wheel construction for vehicles comprising: a bearing member; an outer wheel rotatably mounted in said bearing member having an inner face and an outer face; an inner wheel having an inner face and an outer face; an annular bearing rotatably connecting the inner face of said outer wheel with the outer face of said inner wheel; an outer drum secured to the inner face of said outer wheel; an inner drum secured to said inner wheel, said annular bearing being positioned between two vertical planes enclosing the rims and tires of both said wheels, and braking means to retard the motion of said wheels.

6. A dual wheel construction for vehicles comprising: a bearing member; an outer wheel rotatably mounted in said bearing member having an inner face and an outer face; an inner wheel; an annular bearing rotatably connecting said wheels; an outer drum secured to the inner face of said outer wheel; an inner drum secured to said inner wheel; said annular bearing being of slightly larger diameter than said drums and positioned between two vertical planes enclosing the drums of both said wheels.

VACTOR G. GARNETT.
EDWARD V. GARNETT.

REFERENCES CITED

The following references are of record in the file of this patent:

UNITED STATES PATENTS

| Number | Name | Date |
|---|---|---|
| 2,259,813 | Garnett et al. | Oct. 21, 1941 |